US007902302B2

(12) United States Patent
Blum et al.

(10) Patent No.: US 7,902,302 B2
(45) Date of Patent: Mar. 8, 2011

(54) HYDROXY-FUNCTIONAL POLYESTER-POLYURETHANE DISPERSIONS, METHODS OF PREPARING THE SAME, COMPOSITIONS CONTAINING SUCH DISPERSIONS AND USES THEREFOR

(75) Inventors: Harald Blum, Hafenlohr (DE); Heino Müller, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 14 days.

(21) Appl. No.: 12/121,926

(22) Filed: May 16, 2008

(65) Prior Publication Data

US 2009/0062482 A1 Mar. 5, 2009

(30) Foreign Application Priority Data

May 16, 2007 (DE) .................. 10 2007 023 319

(51) Int. Cl.
*C08L 69/00* (2006.01)

(52) U.S. Cl. .................. 525/440.01; 524/594; 524/538; 524/839; 524/840; 525/418; 525/419; 525/437; 525/439; 525/440.14; 525/449; 525/454; 525/466

(58) Field of Classification Search .................. 524/538, 524/594, 839, 840; 525/440, 440.01, 418, 525/419, 437, 439, 440.14, 449, 454, 466
See application file for complete search history.

(56) References Cited

U.S. PATENT DOCUMENTS

| 3,607,800 | A | * | 9/1971 | Sekmakas | 525/528 |
| 4,108,814 | A | | 8/1978 | Reiff et al. | |
| 4,791,168 | A | * | 12/1988 | Salatin et al. | 524/601 |
| 4,968,536 | A | | 11/1990 | Goldner et al. | |
| 5,126,393 | A | | 6/1992 | Blum et al. | |
| 5,280,062 | A | | 1/1994 | Blum et al. | |
| 5,387,642 | A | | 2/1995 | Blum et al. | |
| 5,569,707 | A | * | 10/1996 | Blum et al. | 524/591 |
| 5,710,209 | A | * | 1/1998 | Blum et al. | 524/591 |

FOREIGN PATENT DOCUMENTS

| CA | 2143026 | 10/2006 |
| DE | 3345618 A1 | 6/1985 |
| DE | 3739332 A1 | 6/1989 |
| DE | 3936288 A1 | 5/1991 |
| EP | 0330139 A2 | 8/1989 |
| EP | 0427028 | 5/1991 |
| EP | 0496205 A1 | 7/1992 |
| EP | 0498156 A1 | 8/1992 |
| EP | 0669352 | 8/1995 |

* cited by examiner

*Primary Examiner* — David Wu
*Assistant Examiner* — Robert Jones
(74) *Attorney, Agent, or Firm* — Connolly Bove Lodge & Hutz LLP

(57) ABSTRACT

Hydroxy-functional polyester-polyurethane dispersions comprising a reaction product of: (a) at least one, at least difunctional polyol component; (b) at least one ionizable compound having at least one acid group and at least one functional group capable of reacting with isocyanate groups, the at least one functional group selected from the group consisting of mono-, di-, and trihydroxycarboxylic acids, hydroxysulfonic acids, aminosulfonic acids, and aminocarboxylic acids; (c) at least one acid anhydride; and (d) at least one, at least difunctional polyisocyanate component; methods for preparing such dispersions; compositions containing such dispersions; and uses thereof.

7 Claims, No Drawings

HYDROXY-FUNCTIONAL POLYESTER-POLYURETHANE DISPERSIONS, METHODS OF PREPARING THE SAME, COMPOSITIONS CONTAINING SUCH DISPERSIONS AND USES THEREFOR

BACKGROUND OF THE INVENTION

Water-thinnable polyesters can be obtained by reacting hydroxy-functional polyesters with acid anhydrides, thus incorporating carboxyl end groups into the polyester, which are converted after neutralization into salt groups having a hydrophilically modifying action. Products of this type are described, e.g., in EP-A 0 330 139 and DE-A 37 39 332, the entire contents of each of which is hereby incorporated by reference. Since the carboxyl groups incorporated in this way can exhibit an increasing tendency to saponify with rising pH value in aqueous solution or dispersion, these products are dissolved in relatively large quantities of organic solvents and are not dispersed in water until shortly before the production or application of the paint. In this way, possible problems based on their susceptibility to be saponified are minimized. However, this minimization is gained at the cost of a very high content of organic solvents, which no longer meets current requirements for low-emission coatings. Moreover, the subsequent dispersing step is relatively laborious and complex.

Aqueous polyester dispersions are often produced by reacting hydroxy-functional polyesters with hydroxycarboxylic acids and polyisocyanates. In this way, the incorporation into the polymer of the acid groups necessary for hydrophilic modification can be achieved via hydrolytically stable urethane groups. Products of this type are described, e.g., in EP-A 0 498 156, EP-A 0 496 205, DE-A 39 36 288 and DE-A 33 45 618, the entire contents of each of which is hereby incorporated by reference. These urethane group-containing polyester dispersions usually exhibit good storage stability, as well as good mechanical and/or optical film properties. It is a disadvantage, however, that to produce these urethane group-containing polyester dispersions, relatively large quantities of solvent are generally needed, which then have to be distilled off again. In addition, the products have significantly higher molecular weights than pure polyesters, which can lead to disadvantages in pigment wetting, in the optical film properties and also in adhesion to critical substrates compared with pure polyesters.

Aqueous polyester-polyurethane dispersions which are simple to produce, require no unusual polyester raw materials, exhibit very good pigmentability and which permit the production of high-quality clear lacquers, paints and coatings with very good flow, variably adjustable hardness/elasticity level and resistance properties and good stone chip protection and anti-corrosive properties, would be advantageous. The dispersions should also be stable when stored at 40° C. in combination with various hardener resins, with no major changes in viscosity or sedimentation occurring. Such viscosity change and/or sedimentation can occur when the dispersion and the hardener are not sufficiently compatible, and/or when slow crosslinking reactions take place.

BRIEF SUMMARY OF THE INVENTION

The present invention relates, in general, to novel, acidified, hydroxy-functional polyester-polyurethane dispersions, methods for the production thereof and their use in combination with hardener resins for the production of lacquers, coatings and adhesives.

Surprisingly, it has been found that the hydroxy-functional polyester-polyurethane dispersions acidified with acid anhydrides in accordance with various embodiments of the present invention satisfy the desired environmental and performance criteria very well and, when combined with hardener resins, such as, e.g., melamine resins and/or polyisocyanates, can be cured to form lacquers and coatings with desired properties.

One embodiment of the present invention includes hydroxy-functional polyester-polyurethane dispersions comprising a reaction product of: (a) at least one, at least difunctional polyol component; (b) at least one ionizable compound (i.e., at least one potentially ionic compound) having at least one acid group and at least one functional group capable of reacting with isocyanate groups, the at least one functional group selected from the group consisting of mono-, di-, and trihydroxycarboxylic acids, hydroxysulfonic acids, aminosulfonic acids, and aminocarboxylic acids; (c) at least one acid anhydride; and (d) at least one, at least difunctional polyisocyanate component.

In additional various embodiments of the polyester-polyurethane dispersions according to the invention, the dispersions comprise reaction products which further contain (e) at least one, at least monohydroxy-functional polyethylene oxide component as a constituent.

The polyester-polyurethane dispersions according to various embodiments of the present invention can optionally also contain other components D.

Another embodiment of the present invention includes methods which comprise:
(i) reacting: (a) at least one, at least difunctional polyol component; and (b) at least one ionizable compound having at least one acid group and at least one functional group capable of reacting with isocyanate groups, the at least one functional group selected from the group consisting of mono-, di-, and trihydroxycarboxylic acids, hydroxysulfonic acids, aminosulfonic acids, and aminocarboxylic acids; with (d) at least one, at least difunctional polyisocyanate component; until an NCO value of 0% is reached, to form an intermediate product;
(ii) reacting the intermediate product with (c) at least one acid anhydride at a temperature of 80 to 180° C., until no anhydride bands are detectable by IR spectroscopy, to form a polymer reaction product; and
(iii) mixing the polymer reaction product with water, and optionally one or more additives selected from the group consisting of neutralizing agents, organic solvents, and auxiliary substances, to form a polyester-polyurethane dispersion.

Another embodiment of the present invention includes coating compositions which comprise a hydroxy-functional polyester-polyurethane dispersion according to one of the various other embodiments of the present invention.

Yet another embodiment of the present invention includes aqueous, reactive, two-part coating compositions which comprise: (a) 60 to 98 wt. % of a hydroxy-functional polyester-polyurethane dispersion according to claim 1; and (b) 2 to 40 wt. % of an optionally hydrophilically-modified, polyisocyanate component having one or more free isocyanate groups.

Still other embodiments of the present invention include use of a hydroxy-functional polyester-polyurethane dispersion according to one of the various other embodiments of the present invention for the production of lacquers, coatings, adhesives or sealants, stoving filler coats, one-coat paints, stone chip protection primers and pigmented topcoats.

DETAILED DESCRIPTION OF THE INVENTION

As used herein, the singular terms "a" and "the" are synonymous and used interchangeably with "one or more" and "at least one," unless the language and/or context clearly indicates otherwise. Accordingly, for example, reference to "a reaction product" herein or in the appended claims can refer to a single product or more than one product.

In various preferred embodiments of the present invention, a polyester-polyurethane dispersions comprises a reaction product of:

70 to 93 wt. %, more preferably 75 to 90 wt. %, of component (a), 0.1 to 3 wt. %, more preferably 0.5 to 1.5 wt. %, of component (b), 2 to 12 wt. %, more preferably 3 to 7.5 wt. %, of component (c), 2 to 12 wt. %, more preferably 3 to 7 wt. %, of component (d), 0.1 to 5 wt. %, more preferably 0.25 to 3.5 wt. %, of component (e) and 0 to 20 wt. %, more preferably 0-10 wt. %, of component (f)

wherein the percentages of components (a) to (f) total 100 wt. %.

Suitable polyol components (a) for use in the various embodiments of the present invention include hydroxy-functional polyesters, polycarbonates, polyethers, polyesteramides, polyesterimides, polyetheramides, polyetherimides, polycarbonate polyethers, polyetheresters and/or polycarbonate polyesters. Suitable polyol components (a) generally have a functionality of 1.5 to 4.

The polyol component (a) preferably includes of a mixture of at least two polyols, the at least two polyols being selected from the group of the hydroxy-functional polyesters, polycarbonates, polyethers, polycarbonate polyethers, polyetheresters and/or polycarbonate polyesters with an average molecular weight of 800 to 6000 g/mol, preferably of 650 to 2500 g/mol, and a functionality of 2 to 3.5, preferably 1.8 to 2.5, and at least one polyol being a polyester Preferred polyether polyols have molecular weights of 344 to 2500 g/mol and an average functionality of 2 to 3.

Particularly preferred polyol components (a) include at least 75 wt. % of a polyester polyol and no more than 25 wt. % of polyether polyols and/or polycarbonate polyols and/or a second polyester polyol, which differs from the first polyester polyol.

The theoretical functionality of the polyester polyols suitable for use in the various embodiments of the present invention is determined according to the following formula:

Eq [OH]–Eq [COOH]/(mol [COOH]+mol [OH])–Eq [COOH].

The polyester polyols suitable for use in the various embodiments of the present invention have weight average molecular weights, determined by calculation, of 500 to 5000 g/mol, preferably of 750 to 4000 g/mol.

The theoretical molecular weight of the polyester polyols suitable for use in the various embodiments of the present invention is determined according to the following formula:

mass of initial charge [g]/(mol [COOH]+mol [OH])– Eq [COOH].

Preferred polyesters which are suitable for use as polyol component (a) include reaction products of:

a1) 30 to 70 wt. % dicarboxylic acids,
a2) 20 to 60 wt. % diols,
a3) 0 to 50 wt. % triols and/or tetraols, and
a4) 0 to 50 wt. % monocarboxylic acids.

Suitable polyester raw materials (a1) include, e.g., phthalic anhydride, isophthalic acid, terephthalic acid, adipic acid, sebacic acid, suberic acid, succinic acid, maleic anhydride, fumaric acid, dimer fatty acids, tetrahydrophthalic anhydride, hexahydrophthalic anhydride, cyclohexanedicarboxylic acid or trimellitic anhydride and mixtures thereof. Preferred components (a1) are adipic acid, phthalic anhydride, tetrahydrophthalic anhydride or isophthalic acid.

Suitable polyester raw materials (a2) include, e.g., 1,2-ethylene glycol, diethylene glycol, triethylene glycol, tetraethylene glycol, 1,2-propylene glycol, dipropylene glycol, tripropylene glycol, 1,3-propanediol, 1,3-butanediol, 1,4-butanediol, 1,6-hexanediol, neopentyl glycol, 1,4-cyclohexanedimethanol, 1,4-cyclohexanediol, butenediol, butynediol, hydrogenated bisphenols, trimethylpentanediol, 1,8-octanediol or tricyclodecanedimethanol and mixtures thereof. Preferred components a2) are 1,4-butanediol, neopentyl glycol, 1,2-propylene glycol, ethylene glycol, diethylene glycol or 1,6-hexanediol.

Suitable polyester raw materials (a3) include, e.g., trimethylolpropane, ethoxylated trimethylolpropane, propoxylated trimethylolpropane, propoxylated glycerol, ethoxylated glycerol, glycerol, pentaerythritol, castor oil or mixtures thereof. Preferred components a3) are trimethylolpropane, glycerol, castor oil or pentaerythritol.

Suitable polyester raw materials (a4) include, e.g., $C_9$-$C_{22}$ fatty acids, such as e.g. 2-ethylhexanoic acid, stearic acid, oleic acid, soybean oil fatty acid, peanut oil fatty acid, other unsaturated fatty acids, hydrogenated fatty acids, benzoic acid or mixtures thereof.

Preferred polyester polyols suitable for use as polyol component (a) have weight average molecular weights of 900 to 2500 g/mol and an average functionality of 2 to 3.5 and an OH value of 120 to 170, preferably 130 to 160 mg KOH/g.

Component (b) comprises an ionizable, i.e., a (potentially) ionic compound, with at least one acid group and at least one group capable of reacting with isocyanate groups. Suitable acid groups include, e.g., carboxyl and sulfonic acid groups. Suitable groups capable of reacting with isocyanate groups include, e.g., hydroxyl and/or amino groups.

Suitable compounds (b) include, e.g., di- or tri- or mono-hydroxycarboxylic acids, hydroxysulfonic acids, aminosulfonic acids or aminocarboxylic acids, such as e.g. 2,2-bis (hydroxymethyl)alkanecarboxylic acids such as dimethylolacetic acid, 2,2-dimethylbutyric acid or 2,2-dimethylolpentanoic acid, dihydroxysuccinic acid, Michael addition products of acrylic acid to amines, such as e.g. isophoronediamine or hexamethylenediamine, or mixtures of such acids, and/or dimethylolpropionic acid and/or hydroxypivalic acid. Also possible is the use of sulfonic acid diols optionally containing ether groups of the type described in U.S. Pat. No. 4,108,814, the entire contents of which are hereby incorporated by reference, and/or 2-aminoethyl-aminoethanesulfonic acid.

Component (b) preferably includes a carboxylic acid having one or two hydroxyl and/or amino groups. Particularly preferably, component (b) includes dimethylolpropionic acid and/or hydroxypivalic acid.

Generally, the contribution of component (b) to the overall acid vale of a polyester-polyurethane dispersion according to the invention is less than 17.0 mg KOH/g of polyester-polyurethane, preferably less than 7.0 mg KOH/g of polyester-polyurethane.

Component (c) includes at least one acid anhydride, such as, e.g., phthalic anhydride, tetrahydrophthalic anhydride, hexahydrophthalic anhydride, maleic anhydride, trimellitic anhydride or pyromellitic anhydride. Trimellitic anhydride is preferred.

Generally, the contribution of component (c) to the overall acid value of a polyester-polyurethane dispersion according to the invention is between 1 and 69 mg KOH/g of polyester-polyurethane, preferably between 17 and 45 mg KOH/g of polyester-polyurethane and particularly preferably between 28 and 36 mg KOH/g of polyester-polyurethane.

Free acid groups of components (b) and (c) represent "potentially ionic" groups, while the salt-like groups, e.g., carboxylate or sulfonate groups obtained by neutralization with neutralizing agents are "ionic" groups.

A suitable component (d) includes at least one, at least difunctional polyisocyanate. Examples of suitable difunctional polyisocyanates include, e.g., di-, tri- or optionally polyfunctional aliphatic isocyanates, such as, e.g., hexamethylene diisocyanate, butane diisocyanate, isophorone diisocyanate, 1-methyl-2,4 (2,6)-diisocyanatocyclohexane, norbornane diisocyanate, tetramethylxylylene diisocyanate, hexahydroxylylene diisocyanate, nonane triisocyanate, 4,4'-diisocyanatodicyclohexylmethane. Also suitable are aromatic isocyanates, such as, e.g., 2,4 (2,6)-diisocyanatotoluene or 2,4- or 4,4'-diisocyanatodiphenylmethane as well as higher molecular-weight or oligomeric polyisocyanates in the molecular weight range of 336 to 1500, based on the aforementioned isocyanates. Mixtures of these isocyanates can also be used.

Isophorone diisocyanate and/or hexamethylene diisocyanate and/or 2,4 (2,6)-diisocyanatotoluene are preferably used.

Suitable monohydroxy-functional polyethylene oxide components (e) include polymers of ethylene oxide or copolymers or block copolymers of ethylene oxide with propylene oxide, e.g. monohydroxy-functional ethylene oxide polyethers, monohydroxy-functional propylene oxide/ethylene oxide copolyethers or monohydroxy-functional propylene oxide/ethylene oxide block polyethers, with methanol, butanol, ethanol, methoxypropanol, butyl glycol or diethylene glycol monoalkyl ether being examples of suitable starter molecules. Component (e) can have a weight average molecular weight of 350 to 2500 g/mol, preferably 500 to 2300 g/mol.

Preferred components (e) include monohydroxy-functional polyethylene oxide components, such as, e.g., polyether LB 25 [butoxypolyethylene glycol; molecular weight 2250 g/mol; Bayer MaterialScience AG, Germany] or methoxypolyethylene glycols with molecular weights of 500 to 1500 g/mol [e.g. MPEG 750, DOW Chemical Company, USA].

Suitable components (f include monoamines, diamines, polyamines, amino alcohols, diols, triols, tetraols, monoalcohols, di- or trifunctional polyethers, difunctional polycarbonate polyols, such as, e.g. hydrazine (hydrate), adipic acid dihydrazide, ethylenediamine, isophoronediamine, diethylenetriamine, ethylene glycol, propylene glycol, neopentyl glycol, butanediol, hexanediol, trimethylolpropane, butyl glycol, butyl diglycol or methoxypropanol, 2-ethylhexanol, stearyl alcohol, benzyl alcohol, polypropylene oxide diols or triols or poly-THF diols or aliphatic polycarbonate diols with molecular weights of 600 to 3000 g/mol or mixtures of the above or other components (f).

Production of polyester-polyurethane dispersions according to the present invention can be carried out using various methods.

One embodiment of the present invention includes methods (method I) for the production of the polyester-polyurethane dispersions according to various other embodiments of the invention, wherein the methods comprise, in a first step, a polyol component (a) and an acid component (b) are reacted with a polyisocyanate component (d) until an NCO value of 0% is reached to form an intermediate reaction product, in a second step the intermediate reaction product is reacted with an anhydride component (c) at 80° C. to 180° C. until no anhydride bands can be detected by IR spectroscopy any longer, and neutralizing agents and optionally organic solvents and/or auxiliary substances are then added and dispersion is carried out by adding water to the polymer or by adding the polymer to water.

In various embodiments wherein a hydroxy-functional polyethylene oxide component (e) and/or optionally components (f) are used, these are reacted with components (a), (b) and (d) in the first step according to method (I) embodiments of the present invention.

In method (I) embodiments according to the present invention, organic solvents may optionally already be present or suitable catalysts added in the first step. Excess amounts of solvent can subsequently be separated off, completely or partly, by distillation.

In another embodiment of the method (I) according to the invention, a partial quantity of the total quantity of polyol component (a) is reacted with acid component (b) and with polyisocyanate component (d) in the first step, and in the second step the remaining quantity of polyol component (a) is added, with 15 to 75 wt. %, preferably 25 to 60 wt. %, of the total quantity of component (a) being used in the first reaction step. Such partial addition embodiments are preferred.

Another embodiment of the present invention includes methods (method XI) for the production of the polyester-polyurethane dispersions according to various other embodiments of the invention, wherein the methods comprise, in the first step, a polyol component (a) is reacted with the anhydride component (c) at 80° C. to 180° C. until no anhydride bands can be detected by IR spectroscopy any longer to form an intermediate reaction product, in a second step the intermediate reaction product is reacted with acid component (b) and polyisocyanate component (d) until an NCO value of 0% is reached and then neutralizing agent and optionally organic solvents and/or auxiliary substances are added and dispersion is carried out by adding water to the polymer or by adding the polymer to water.

In various embodiments wherein a hydroxy-functional polyethylene oxide component (e) and/or components (f) are used, these are reacted with components (b) and (d) in the second step according to method (II) embodiments of the present invention.

In method (II) embodiments according to the invention, organic solvents or neutralizing agents may optionally already be present or suitable catalysts added in the second step. Excess amounts of solvent can subsequently be separated off, completely or partly, by distillation.

In another embodiment of the method (II) according to the invention, a partial quantity of the total quantity of polyol component a) is reacted with the anhydride component c) in the first step, and in the second step the remaining quantity of polyol component a) is added, with 15 to 75 wt. %, preferably 25 to 60 wt. %, of the total quantity of component a) being used in the first reaction step. Such partial addition embodiments are also preferred for method (II).

Suitable catalysts include, e.g., dibutyl tin dilaurate, tin(II) octoate, dibutyl tin oxide, diazabicyclononane, diazabicycloundecene, zinc or bismuth salts, tertiary amines such as, e.g., triethylamine, dimethylcyclohexylamine or ethyldiisopropylamine.

Suitable neutralizing agents include, e.g., triethylamine, N-methylmorpholine, dimethylisopropylamine, ethyldiisopropylamine, dimethylethanolamine, methyldiethanolamine, triethanolamine, diethanolamine, ethanolamine, 2-amino-2- methyl-1-propanol, ammonia, dimethylcyclohexylamine, morpholine, potassium hydroxide or sodium hydroxide or mixtures thereof.

In all, an amount of neutralizing agent can be added such that the degree of neutralization, based on incorporated acid groups, is 40 to 150%, preferably 60 to 100%. The degree of neutralization is particularly preferably selected such that the pH of the dispersion according to the invention is 6.7 to 7.3.

Suitable solvents for the production of the polyester-polyurethane dispersions according to the invention include, in principle, all solvents that are non-reactive with isocyanate, such as, e.g., N-ethylpyrrolidone, N-methylpyrrolidone, diethylene glycol dialkyl ether, methoxypropyl acetate, Solvent Naphta®, acetone or methyl ethyl ketone. After reaction with the acid anhydride, other solvents such as, e.g., butyl glycol, methoxypropanol, diethylene glycol or butyl diglycol can also be added. Excess amounts of solvents can be removed by distillation, during which the of excess amounts of solvents can take place under reduced pressure at e.g. 20 to 80° C. during or after dispersion in/with distilled water. Preferably, however, quantities of solvent are added only such that the resulting dispersions according to the invention contain no more than 5 wt. % organic solvents.

The solids content of the polyester-polyurethane dispersions according to the invention is generally 30 to 55 wt. %, preferably 35 to 45 wt. %.

The polyester-polyurethane dispersions according to the invention can have particle diameters, determined by LCS measurements, of 10 to 300 nm, preferably of 15 to 60 nm, and more preferably 15-40 nm.

The polyester-polyurethane dispersions according to the invention can also be mixed together with other ionic or non-ionic dispersions and used jointly, the following, for example, being suitable in principle: polyvinyl acetate, polyethylene, polystyrene, polybutadiene, polyvinyl chloride, polyurethane, other polyester, polyacrylate and/or copolymer dispersions.

The present invention also provides coating compositions containing the polyester-polyurethane dispersions according to the various embodiments of the present invention.

The coating compositions can contain the conventional auxiliary substances and additives. These include, for example, hardeners such as carbodiimides, polyisocyanates, blocked polyisocyanates, as well as amino hardener resins such as, e.g., partly or completely etherified melamine resins or urea-formaldehyde condensation products or curing amino resins, organic or inorganic pigments or metallic pigments based on aluminum flakes; fillers such as e.g. carbon black, silica, talcum, kaolin, glass as a powder or in the form of fibers, cellulose and mixtures thereof or of other additives customary in the production of lacquers, coatings and adhesives, such as, e.g., surface-active substances, emulsifiers, stabilizers, anti-settling agents, UV stabilizers, defoamers, antioxidants, anti-skinning agents, flow promoters, thickeners or bactericides.

The invention also provides the use of the polyester-polyurethane dispersions according to the invention for the production of lacquers, coatings, adhesives or sealants.

The invention also provides coating compositions containing (A) a hydroxy-functional polyester-polyurethane dispersion according to one or more of the various embodiments of the present invention, and (B) blocked polyisocyanates or polyisocyanates containing free isocyanate groups or amino hardener resin, wherein the polyisocyanates may optionally be hydrophilically modified.

Suitable blocked polyisocyanates include, e.g., reaction products of difunctional isocyanates, such as, e.g., isophorone diisocyanate, hexamethylene diisocyanate, 2,4- or 2,6-diisocyanatotoluene, 4,4'-diphenylmethane diisocyanate or their higher molecular weight trimers, biurets, urethanes or allophanates, with blocking agents, such as, e.g., methanol, ethanol, butanol, hexanol, benzyl alcohol, acetoxime, butanone oxime, caprolactam, phenol, dimethyl malonate, diethyl malonate, dimethylpyrazole, triazole, dimethyl triazole, acetoacetic acid, diisopropylamine, dibutylamine, tert.-butylbenzylamine, cyclopentanone carboxyethyl ester, dicyclohexylamine or tert.-butyl-isopropylamine.

The aforementioned blocked polyisocyanates can also be converted to a water-dispersible form by incorporating hydrophilic groups, such as, e.g., carboxylate, sulfonate and/or polyethylene oxide structures, and used in this way in combination with the polyester-polyurethane dispersions according to the invention. The aforementioned blocked polyisocyanates can also be produced with the joint use of hydroxy- or amino-functional, also higher molecular-weight components, such as, e.g., diols, triols, amino alcohols, polyesters, polyethers, polycarbonates and mixtures of the aforementioned or other raw materials.

The polyester-polyurethane dispersions according to the invention can be used for the production of stoving lacquers and coatings which are cured at temperatures of 80° C. to 230° C. Preferred areas of application are stoving filler coats, one-coat paints, stone chip protection primers and pigmented topcoats.

The polyester-polyurethane dispersions according to the invention can also be used for the production of reactive aqueous two-pack (2K) polyurethane lacquers and coatings.

Preferred are aqueous, reactive two-pack coating compositions comprising:

(A) 60 to 98 wt. % of a polyester-polyurethane dispersion according to one or more of the various embodiments of the present invention, and (B) 2 to 40 wt. % polyisocyanates containing free isocyanate groups, which may optionally be hydrophilically modified.

The polyester-polyurethane dispersions according to the invention are, in principle, suitable for coating, painting, bonding, treating and sealing a wide variety of substrates, particularly metals, wood, ceramics, stone, concrete, bitumen, hardboard, glass, porcelain, plastics, leather or textiles of many different types.

The coating compositions containing the polyester-polyurethane dispersions according to the invention are distinguished by very good processability and provide coatings which display excellent film appearance and flow, very low cratering tendency, good resistance properties and a balanced hardness/elasticity level.

If the polyester-polyurethane dispersions according to the invention are applied to substrates alone, clear coats having very good flow, without defects or craters, are obtained and very high film thicknesses are possible.

The invention will now be described in further detail with reference to the following non-limiting examples.

EXAMPLES

Polyol Example 1

Polyester Polyol (PES1)

In a 5 liter reactor with stirrer, reflux condenser, distillation head and gas dispersion tube, 2486 g phthalic anhydride, 563 g trimethylolpropane, 874 g neopentyl glycol and 890 g diethylene glycol are esterified in the presence of 2 g of the catalyst Fascat® 4100 (tin catalyst, Arkema Inc., USA) at 190° C. until an acid value of 2.4 is reached. The polyester (PES1) has an OH value of 148 mg KOH/g substance.

Polyol Example 2

Polyester Polyol (PES2)

In a 5 liter reactor with stirrer, reflux condenser, distillation head and gas dispersion tube, 1743 g isophthalic acid, 563 g trimethylolpropane, 1747 g neopentyl glycol and 920 g adipic acid are esterified in the presence of 2 g of the catalyst Fascat® 4100 (tin catalyst, Arkema Inc., USA) at 190° C. until an acid value of 2.4 is reached. The polyester (PES2) has an OH value of 146 mg KOH/g substance.

Polyol Example 3

Polyester Polyol (PES3)

In a 5 liter reactor with stirrer, reflux condenser, distillation head and gas dispersion tube, 932 g phthalic anhydride, 549 g trimethylolpropane, 1765 g diethylene glycol and 1743 g isophthalic acid are esterified in the presence of 2 g of the catalyst Fascat® 4100 (tin catalyst, Arkema Inc., USA) at 190° C. until an acid value of 2.1 is reached. The polyester (PES3) has an OH value of 136 mg KOH/g substance.

Polyol Example 4

Polyester Polyol (PES4)

In a 15 l reactor with stirrer, reflux condenser, distillation head and gas dispersion tube, 7104 g phthalic anhydride, 1568 g trimethylolpropane, 5043 g diethylene glycol and 856 g castor oil are esterified in the presence of 2 g of the catalyst Fascat® 4100 (tin catalyst, Arkema Inc., USA) at 190° C. until an acid value of 2.2 is reached. The polyester (PES4) has an OH value of 150 mg KOH/g substance.

Dispersion Example 1

Acidified, Hydroxy-Functional PES-PUR Dispersion (1)

444 g polyester polyol (PES4), 10 g dimethylolpropionic acid and 15.5 g polyether LB 25 (monohydroxy-functional polyethylene oxide, molecular weight 2250 g/mol; Bayer MaterialScience AG, Germany) are weighed into a 4 l reaction vessel with a stirrer, reflux condenser and nitrogen feed and homogenized at 100° C. A mixture of 12.8 g isophorone diisocyanate and 38.6 g hexamethylene diisocyanate is then added, stirring at 120° C. until the NCO content is 0%. Next, 57.3 g trimellitic anhydride and a further 444 g of the polyester polyol PES4) are added, heated to 160° C. and stirred until an anhydride band can no longer be detected by infrared (IR) spectroscopy. Next, 113 g butyl glycol are added with stirring, the mixture is cooled to 80° C., neutralized with 52 g dimethylethanolamine and dispersed by adding 1246 g distilled water.

The PES-PUR Dispersion (1) is obtained with a solids content of 41.2%, a pH value of 6.8 and an average particle size of 27 nm.

Dispersion Example 2

Acidified, Hydroxy-Functional PES-PUR Dispersion (2)

443 g polyester polyol (PES2), 10 g dimethylolpropionic acid and 7.7 g polyether LB 25 (monohydroxy-functional polyethylene oxide, molecular weight 2250 g/mol; Bayer MaterialScience AG, Germany) are weighed into a 4 l reaction vessel with a stirrer, reflux condenser and nitrogen feed and homogenized at 100° C. A mixture of 12.8 g isophorone diisocyanate and 38.6 g hexamethylene diisocyanate is then added, followed by 56 g N-ethylpyrrolidone, stirring at 120° C. until the NCO content is 0%. Next, 57.3 g trimellitic anhydride, a further 442 g of the polyester polyol (PES4) and 28 g N-ethylpyrrolidone are added, heated to 160° C. and stirred until an anhydride band can no longer be detected by infrared (IR) spectroscopy. Next, 28 g butyl glycol are added with stirring, the mixture is cooled to 80° C., neutralized with 55 g dimethylethanolamine and dispersed by adding 1230 g distilled water.

The PES-PUR Dispersion (2) is obtained with a solids content of 43.2%, a pH value of 7.3 and an average particle size of 19 nm.

Dispersion Example 3

Acidified, Hydroxy-Functional PES-PUR Dispersion (3)

437 g polyester polyol (PES1), 10 g dimethylolpropionic acid and 7.8 g polyether LB 25 (monohydroxy-functional polyethylene oxide, molecular weight 2250 g/mol; Bayer MaterialScience AG, Germany) are weighed into a 4 l reaction vessel with a stirrer, reflux condenser and nitrogen feed and homogenized at 100° C. A mixture of 12.8 g isophorone diisocyanate and 38.6 g hexamethylene diisocyanate is then added, followed by 55 g N-ethylpyrrolidone, stirring at 120° C. until the NCO content is 0%. Next, 57.3 g trimellitic anhydride and a further 436 g of the polyester polyol (PES1) are added, heated to 160° C. and stirred until an anhydride band can no longer be detected by infrared (IR) spectroscopy. Next, 55 g butyl glycol are added with stirring, the mixture is cooled to 80° C., neutralized with 55 g dimethylethanolamine and dispersed by adding 1217 g distilled water.

The PES-PUR Dispersion (3) is obtained with a solids content of 41.1%, a pH value of 7.3 and an average particle size of 24 nm.

Dispersion Example 4

Acidified, Hydroxy-Functional PES-PUR Dispersion (4)

476 g polyester polyol (PES3), 10 g dimethylolpropionic acid and 7.8 g polyether LB 25 (monohydroxy-functional polyethylene oxide, molecular weight 2250 g/mol; Bayer MaterialScience AG, Germany) are weighed into a 4 l reaction vessel with a stirrer, reflux condenser and nitrogen feed and homogenized at 100° C. A mixture of 3119 g isophorone diisocyanate and 24.2 g hexamethylene diisocyanate is then added, followed by 57 g N-ethylpyrrolidone, stirring at 120° C. until the NCO content is 0%. Next, 57.3 g trimellitic anhydride and a further 475 g of the polyester polyol (PES3) are added, heated to 160° C. and stirred until an anhydride band can no longer be detected by infrared (IR) spectroscopy. Next, 63 g butyl glycol are added with stirring, the mixture is cooled to 80° C., neutralized with 54 g dimethylethanolamine and dispersed by adding 1320 g distilled water.

The PES-PUR Dispersion (4) is obtained with a solids content of 40.2%, a pH value of 6.8 and an average particle size of 21 nm.

Dispersion Example 1

Acidified, Hydroxy-Functional PES-PUR Dispersion (5)

402 g polyester polyol (PES4), 69 g of an adipic acid/hexanediol/neopentyl glycol polyester with an OH value of 66 g/mole and 11.3 g dimethylolpropionic acid are weighed into a 4 l reaction vessel with a stirrer, reflux condenser and nitrogen feed and homogenized at 100° C. A mixture of 37.3 g isophorone diisocyanate and 18.8 g hexamethylene diisocyanate is then added, stirring at 120° C. until the NCO content is 0%. Next, 57.4 g trimellitic anhydride and a further 433 g of the polyester polyol (PES4) are added, heated to 160° C. and stirred until an anhydride band can no longer be detected by infrared (IR) spectroscopy. Next, 114 g butyl glycol are added with stirring, the mixture is cooled to 80° C., neutralized with 53 g dimethylethanolamine and dispersed by adding 1253 g distilled water.

The PES-PUR Dispersion (5) is obtained with a solids content of 43.0%, a pH value of 6.7 and an average particle size of 23 nm n.

Dispersion Example 6

Acidified, Hydroxy-Functional PES-PUR Dispersion 261 g polyester polyol (PES4) and 6.8 g dimethylolpropionic acid are weighed into a 4 l reaction vessel with a stirrer, reflux condenser and nitrogen feed and homogenized at 100° C. 37.5 g isophorone diisocyanate are then added, stirring at 120° C. until the NCO content is 0%. Next, 34.1 g trimellitic anhydride and a further 261 g of the polyester polyol (PES4) are added, heated to 160° C. and stirred until an anhydride band can no longer be detected by infrared (IR) spectroscopy. Next, 66 g butyl glycol are added with stirring, the mixture is cooled to 80° C., neutralized with 31 g dimethylethanolamine and dispersed by adding 635 g distilled water.

The PES-PUR Dispersion (6) is obtained with a solids content of 44.3%, a pH value of 6.7 and an average particle size of 25 nm n.

Applicational Test Results:

Pour Test:

The PES-PUR Dispersions (1), (2), (3), (4), (5) and (6) are each diluted by adding 20% water and these diluted solutions are each poured on to a cleaned glass plate in such a way that the solution can run. Visual evaluation is then carried out of the flow (evaluation: in order=OK and not in order=not OK) and the cratering tendency (evaluation: m=quantity of craters/from (m1=no craters or very occasional craters) to (m5=very many craters) and g=size of craters from (g1=no craters) or very small craters to (g5 very large craters).

Pour test PES-PUR Dispersion (1) craters: m1/g1; flow: OK

Pour test PES-PUR Dispersion (2) craters: m1/g1; flow: OK

Pour test PES-PUR Dispersion (3) craters: m1/g1; flow: OK

Pour test PES-PUR Dispersion (4) craters: m1/g1; flow: OK

Pour test PES-PUR Dispersion (5) craters: m1/g1; flow: OK

Pour test PES-PUR Dispersion (6) craters: m1/g2; flow: OK

Clear Lacquers are Produced from the Polyester-Polyurethane Dispersions:

Clear lacquer from PES-PUR Dispersion (1):

The constituents are: 207 g PES-PUR Dispersion (1), 15.5 g Maprenal® W 904 (melamine resin, Ineos Melamins GmbH, Fr Germany); 1.7 g Addito® XW 395 (wetting additive, Cytec Surface Specialities; USA), 1.7 g Surfynol® 104E (surfactant, Air Products Chemicals Europe B.V., Netherlands), 4.5 g of a 10% aqueous solution of dimethylethanolamine and 58 g of distilled water.

The constituents are homogenized, a lacquer film is applied and, after being left to evaporate for 10 minutes at room temperature, it is stoved for 30 minutes at 140° C. The lacquer has a solids content of 35% and a flow time according to ISO 5 of 38 s. The flow time remains stable even after 10 days' storage at 40° C. After stoving, a lacquer film is obtained with very good flow and film appearance, a pendulum hardness according to DIN 53157 of 113 s and a partial solubility of 0123*.

Solvent Resistance Test:

Exposure of cured lacquer film to 4 different solvents for 1 minute each.

Evaluation: 0=nothing abnormal detected, 1 slight softening (reversible), 2=moderate softening (reversible), 3=marked softening, 4=slight damage to the lacquer, 5=lacquer is lifted/totally damaged.

Clear lacquer from PES-PUR Dispersion (2): The constituents are: 197 g PES-PUR Dispersion (2), 15.5 g Maprenal® N 904; 1.7 g Additol® XW 395, 1.7 g Surfynol® 104E, 3.9 g of a 10% aqueous solution of dimethylethanolamine and 20 g of distilled water.

The constituents are homogenized, a lacquer film is applied and, after being left to evaporate for 10 minutes at room temperature, it is stoved for 30 minutes at 140° C. The lacquer has a solids content of 42% and a flow time according to ISO 5 of 40 s. After stoving, a lacquer film is obtained with very good flow and film appearance, a pendulum hardness of 168 s and a solvent resistance of 2222.

Clear lacquer from PES-PUR Dispersion (3): The constituents are: 207 g PES-PUR Dispersion (3), 15.5 g Maprenal® MF 904; 1.7 g Additol® XW 395, 1.7 g Surfynol® 104E, 4.5 g of a 10% aqueous solution of dimethylethanolamine and 35 g of distilled water.

The constituents are homogenized, a lacquer film is applied and, after being left to evaporate for 10 minutes at room temperature, it is stoved for 30 minutes at 140° C. The lacquer has a solids content of 38% and a flow time according to ISO 5 of 32 s. After stoving, a lacquer film is obtained with very good flow and film appearance, a pendulum hardness of 224 s and a solvent resistance of 0124.

A salt spray test according to DIN 53167 of the lacquer on a steel sheet after curing for 144 hours leads to creep corrosion on a cut in the lacquer film of only 13 mm.

Clear lacquer from PES-PUR Dispersion (4): The constituents are: 211.4 g PES-PUR Dispersion (4), 15.5 g Maprenal® MF 904; 1.7 g Additol® XW 395, 1.7 g Surfynol® 104E, 5.2 g of a 10% aqueous solution of dimethylethanolamine and 34 g of distilled water.

Clear lacquer from PES-PUR Dispersion (5): The constituents are: 198 g PES-PUR dispersion 5), 15.5 g Maprenal® MF 904; 1.7 g Additol® XW 395, 1.7 g Surfynol® 104E, 5.2 g of a 10% aqueous solution of dimethylethanolamine and 52 g of distilled water.

The constituents are homogenized, a lacquer film is applied and, after being left to evaporate for 10 minutes at room temperature, it is stoved for 30 minutes at 140° C. The lacquer has a solids content of 37% and a flow time according to ISO 5 of 41 s. Even after 40 days' storage at 40° C., the flow time remains almost unchanged (37 s). After stoving, a lacquer film is obtained with very good flow and film appearance, a pendulum hardness of 104 s and a solvent resistance of 0134.

Clear Lacquer from PES-PUR Dispersion (6) with Melamine as Hardener: The constituents are 170.5 g PES-PUR Dispersion (6), 29.4 g Cymel® 328 (melamine hardener resin, Cytec Industries, USA), 1.7 g Additol® XW 395, 1.7 g Surfynol® 104E, 4.1 g of a 10% aqueous solution of dimethylethanolamine and 53 g of distilled water.

The constituents are homogenized, a lacquer film is applied and, after being left to evaporate for 10 minutes at room temperature, it is stoved for 30 minutes at 140° C. The lacquer has a solids content of 39% and a flow time according to ISO 5 of 41 s. After stoving, a lacquer film is obtained with very good flow and film appearance, a pendulum hardness of 198 s and a solvent resistance of 0000.

Clear lacquer from PES-PUR Dispersion (6) with blocked isocyanate as hardener: The constituents are 100 g PES-PUR Dispersion (6), 97.1 g Bayhydur® BL 5140 (dispersion with blocked polyisocyanate groups, Bayer MaterialScience, Leverkusen, Germany); 1.7 g Additol® XW 395, 1.7 g Surfynol® 104E, 4.1 g of a 10% aqueous solution of dimethylethanolamine and 53 g of distilled water.

The constituents are homogenized, a lacquer film is applied and, after being left to evaporate for 10 minutes at room temperature, it is stoved for 30 minutes at 140° C. The lacquer has a solids content of 36% and a flow time according to ISO 5 of 40 s. After stoving, a highly elastic lacquer film is obtained with very good flow and film appearance, a pendulum hardness of 171 s and a solvent resistance of 0333.

A salt spray test for 144 hours leads to creep corrosion on a cut in the lacquer film of 18 mm.

Pigmented Lacquer (Degree of Pigmentation 100%) from PES-PUR Dispersion (1): The constituents are: 99.5 g of a pigment paste, 119 g PES-PUR dispersion 1), 9.5 g Maprenal® MF 904, 1.8 g of a 10% aqueous solution of dimethylethanolamine and 32 g of distilled water, which are ground in a bead mill.

A lacquer film is then applied and cured for 8 minutes at room temperature, 10 minutes at 80° C. and then 22 minutes at 165° C. The lacquer has a solids content of 49% and a flow time according to ISO 5 of 40 s. After stoving, a lacquer film is obtained with very good flow and film appearance, a pendulum hardness of 140 s and a partial solubility of 1122. The Gardner gloss value is 78% (600). The Erichsen indentation is 9.5 mm, the values of the impact test are >80/>80 (in/out), the cross cut test according to DIN 53151 (0 most favorable value, 5=least favorable value)=0.

A salt spray test on steel for 144 hours leads to creep corrosion on a scratch in the lacquer film of 13 mm.

On a complete lacquer system consisting of an electrophoretic lacquer layer, a filler according to the pigmented lacquer described above based on PES-PUR Dispersion (1), a brilliant black basecoat and a clear lacquer, stone chip tests are carried out with very good results:

VDA bombardment according to DIN 55996-1/B (2×500 g; 2 bar, 450):

Degree of bombardment (evaluation 0-5; 0=most favorable value)=1.5; main level of separation=electrophoretic lacquer BMW wedge according to DIN 55996-2 (3 bar, −20° C.):

Chip size (mm)=2.1; main level of separation electrophoretic lacquer

DC bombardment according to DIN 55996-3 (250 km/h; −20° C.):

Chip size (mm): 2; main level of separation=metal sheet

Polyol Example 5

Polyester Polyol (PES5)

In a 5 liter reactor with stirrer, reflux condenser, distillation head and gas dispersion tube, 1570 g isophthalic acid, 576 g trimethylolpropane, 1789 g neopentyl glycol and 1146 g adipic acid are esterified in the presence of 2 g of the catalyst Fascat® 4100 (tin catalyst, Arkema Inc., USA) at 190° C. until an acid value of 2.0 is reached. The polyester PES5) has an OH value of 155 mg KOH/g substance.

Polyol Example 6

Polyester Polyol (PES6)

In a 5 liter reactor with stirrer, reflux condenser, distillation head and gas dispersion tube, 2279 g phthalic anhydride, 590 g trimethylolpropane, 698 g neopentyl glycol, 1166 g diethylene glycol and 321 g adipic acid are esterified in the presence of 2 g of the catalyst Fascat® 4100 (tin catalyst, Arkema Inc., USA) at 190° C. until an acid value of 2.4 is reached. The polyester PES6) has an OH value of 149 mg KOH/g substance.

Dispersion Example 7

Acidified, Hydroxy-Functional PES-PUR Dispersion (7)

448 g polyester polyol (PES5), 7.8 g polyether LB 25, 10 g dimethylolpropionic acid and 55.8 N-ethylpyrrolidone are weighed into a 4 l reaction vessel with a stirrer, reflux condenser and nitrogen feed and homogenized at 100° C. 48.3 g hexamethylene diisocyanate are then added, stirring at 120° C. until the NCO content is 0%. Next, 57.3 g trimellitic anhydride and a further 448 g of the polyester polyol (PES5) are added, heated to 160° C. and stirred until an anhydride band can no longer be detected by infrared (IR) spectroscopy. Next, 55 g butyl glycol are added with stirring, the mixture is cooled to 80° C., neutralized with 50.8 g dimethylethanolamine and dispersed by adding 1190 g distilled water.

The PES-PUR Dispersion (7) is obtained with a solids content of 42.7%, a pH value of 7.2 and an average particle size of 23 nm.

Dispersion Example 7

Acidified, Hydroxy-Functional PES-PUR Dispersion (8)

448 g polyester polyol (PES6), 7.8 g polyether LB 25, 6.8 g dimethylolpropionic acid and 55.8 g N-ethylpyrrolidone are weighed into a 4 l reaction vessel with a stirrer, reflux condenser and nitrogen feed and homogenized at 100° C. 48.3 g hexamethylene diisocyanate are then added, stirring at 120° C. until the NCO content is 0%. Next, 57.3 g trimellitic anhydride and a further 448 g of the polyester polyol (PES6) are added, heated to 160° C. and stirred until an anhydride band can no longer be detected by infrared (IR) spectroscopy. Next, 55 g butyl glycol are added with stirring, the mixture is cooled to 80° C., neutralized with 54 g dimethylethanolamine and dispersed by adding 1290 g distilled water.

The Dispersion (8) is obtained with a solids content of 41.7%, a pH value of 7.1 and an average particle size of 25 nm.

Clear lacquer from PES-PUR Dispersion (7); The constituents are: 199 g Dispersion (7), 15.5 g Maprenal® MF 904; 1.7 g Additol® XW 395, 1.7 g Surfynol® 104E, 5.1 g of a 10% aqueous solution of dimethylethanolamine and 26 g of distilled water.

The constituents are homogenized, a lacquer film is applied and, after being left to evaporate for 10 minutes at room temperature, it is stoved for 30 minutes at 140° C. The lacquer has a solids content of 40% and a flow time according to ISO 5 of 41 s. After stoving, a lacquer film is obtained with very good flow and film appearance, a pendulum hardness of 88 s and a solvent resistance of 2224.

A salt spray test for 144 hours leads to creep corrosion on a scratch in the lacquer film of 20 mm.

Clear lacquer from PES-PUR Dispersion (8): The constituents are: 204 g Dispersion (8), 15.5 g Maprenal® MF 904; 1.7 g Additol® XW 395, 1.7 g Surfynol® 104E, 4.5 g of a 10% aqueous solution of dimethylethanolamine and 46 g of distilled water.

The constituents are homogenized, a lacquer film is applied and, after being left to evaporate for 10 minutes at room temperature, it is stoved for 30 minutes at 140° C. The lacquer has a solids content of 37% and a flow time according to ISO 5 of 40 s. After stoving, a lacquer film is obtained with very good flow and film appearance, a pendulum hardness of 162 s and a solvent resistance of 1124.

A salt spray test for 144 hours leads to creep corrosion on a scratch in the lacquer film of 10 mm.

Dispersion Example 9

Acidified, Hydroxy-Functional PES-PUR Dispersion (9)

581 g polyester polyol (PES5), 7.8 g polyether LB 25, 10 g dimethylolpropionic acid and 24 Proglide® DMM (glycol ether solvent, DOW, UK) are weighed into a 4 l reaction vessel with a stirrer, reflux condenser and nitrogen feed and homogenized at 100° C. 48.3 g hexamethylene diisocyanate are then added, stirring at 120° C. until the NCO content is 0%. Next, 57.3 g trimellitic anhydride and a further 315 g of the polyester polyol (PES5) are added, heated to 160° C. and stirred until an anhydride band can no longer be detected by infrared (IR) spectroscopy. Next, 95 g butyl glycol are added with stirring, the mixture is cooled to 80° C., neutralized with 51 g dimethylethanolamine and dispersed by adding 1190 g distilled water.

The Dispersion (9) is obtained with a solids content of 42%, a pH value of 7.1 and an average particle size of 25 nm.

Dispersion Example 10

Acidified, Hydroxy-Functional PES-PUR Dispersion, (10)

448 g polyester polyol (PES5) and 57.3 g trimellitic anhydride are weighed into a 4 l reaction vessel with a stirrer, reflux condenser and nitrogen feed, heated to 160° C. and stirred until an anhydride band can no longer be detected by infrared (IR) spectroscopy. Next, the mixture is cooled to 110° C. and 24.5 g Solvesso® 100 (hydrocarbon mixture, Exxon Mobile, USA), 448 g of the polyester polyol PES5), 7.8 g polyether LB 25 and 10 g dimethylolpropionic acid are weighed in and homogenized. Next, 63.8 g isophorone diisocyanate are added, stirring at 135° C. until the NCO content is 0%. Next, 96.4 g butyl glycol are added with stirring, the mixture is cooled to 80° C., neutralized with 52 g dimethylethanolamine and dispersed by adding 1200 g distilled water.

The Dispersion (10) is obtained with a solids content of 42%, a pH value of 7.3 and an average particle size of 25 nm.

Clear lacquer from PES-PUR Dispersion (9): The constituents are: 202 g PES-PUR Dispersion (9), 15.5 g Maprenal® MF 904; 1.7 g Additol® XW 395, 1.7 g Surfynol® 104E, 6.3 g of a 10% aqueous solution of dimethylethanolamine and 29 g of distilled water.

The constituents are homogenized, a lacquer film is applied and, after being left to evaporate for 10 minutes at room temperature, it is stoved for 30 minutes at 140° C. The lacquer has a solids content of 39% and a flow time according to ISO 5 of 37 s. After stoving, a lacquer film is obtained with very good flow and film appearance, a pendulum hardness of 132 s and a solvent resistance of 2244.

A salt spray test for 144 hours leads to creep corrosion on a scratch in the lacquer film of 12 mm. In combination with a blocked polyisocyanate hardener (Bayhydur® BL 5140), lacquers that are also stable when stored at 40° C. are obtained as well as films with very good flow, very good film appearance and a pendulum hardness of 135 s and an Erichsen indentation of >9 mm.

Clear lacquer from PES-PUR Dispersion (IQ): The constituents are: 202 g PES-PUR Dispersion (10), 15.5 g Maprenal® MF 904; 1.7 g Additol® XW 395, 1.7 g Surfynol® 104E, 3.2 g of a 10% aqueous solution of dimethylethanolamine and 24 g of distilled water.

The constituents are homogenized, a lacquer film is applied and, after being left to evaporate for 10 minutes at room temperature, it is stoved for 30 minutes at 140° C., The lacquer has a solids content of 40% and a flow time according to ISO 5 of 42 s. After stoving, a lacquer film is obtained with very good flow and film appearance, a pendulum hardness of 173 s and a solvent resistance of 2244.

A salt spray test for 144 hours leads to creep corrosion on a scratch in the lacquer film of 17 mm. In combination with a blocked polyisocyanate hardener (Bayhydur® BL 5140), lacquers that are also stable when stored at 40° C. are obtained as well as films with very good flow, very good film appearance and a very high pendulum hardness of 195 s.

Considered overall, the PES-PUR dispersions according to the invention are inexpensive, simple to produce dispersions which, when combined with various hardener resins, are stable even when stored at 40° C. and, after application and stoving, lead to lacquers and coatings with very good flow, very good film appearance and variably adjustable hardness/elasticity ratios. The solvent resistance properties are also variable within broad ranges, and the dispersions are suitable e.g. for the production of high-quality stoving fillers or stone chip protection coatings.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A hydroxy-functional polyester-polyurethane dispersion comprising a reaction product of: (a) at least one, at least difunctional polyol component; (b) at least one ionizable compound having at least one acid group and at least one functional group capable of reacting with isocyanate groups, the at least one functional group selected from the group consisting of mono-, di-, and trihydroxycarboxylic acids, hydroxysulfonic acids, aminosulfonic acids, and aminocarboxylic acids; (c) at least one acid anhydride; and (d) at least one, at least difunctional polyisocyanate component; wherein the at least one, at least difunctional polyol component comprises at least 75 wt. % of a first polyester polyol having a weight average molecular weight of 900 to 2500 g/mol and an average functionality of 2 to 3.5 and a secondary component selected from the group consisting of polyether polyols, polycarbonate polyols having weight average molecular weight of 800 to 6000 g/mol and a functionality of 2 to 3.5, and second polyester polyols which differ from the first polyester polyol, and wherein the secondary component is present in an amount up to 25 wt. %.

2. The hydroxy-functional polyester-polyurethane dispersion according to claim 1, wherein the reaction product further comprises (e) at least one, at least monohydroxy-functional polyethylene oxide component.

3. The hydroxy-functional polyester-polyurethane dispersion according to claim 1, wherein the at least one ionizable compound comprises an acid selected from the group consisting of dimethylolpropionic acid, hydroxypivalic acid, and mixtures thereof.

4. The hydroxy-functional polyester-polyurethane dispersion according to claim 1, wherein the at least one acid anhydride comprises trimellitic anhydride.

5. A coating composition comprising a hydroxy-functional polyester-polyurethane dispersion according to claim 1.

6. The coating composition according to claim 5, further comprising a component selected from the group consisting of: optionally hydrophilically-modified, blocked polyisocyanates; optionally hydrophilically-modified, polyisocyanates having one or more free isocyanate groups; amino-hardener resins; and combinations thereof.

7. An aqueous, reactive, two-part coating composition comprising:
(a) 60 to 98 wt. % of a hydroxy-functional polyester-polyurethane dispersion according to claims 1; and
(b) 2 to 40 wt. % of an optionally hydrophilically-modified, polyisocyanate component having one or more free isocyanate groups.

* * * * *